(12) United States Patent
Leon et al.

(10) Patent No.: US 10,132,168 B2
(45) Date of Patent: Nov. 20, 2018

(54) AIRFOIL

(71) Applicant: United Technologies Corporation, Hartford, CT (US)

(72) Inventors: Jeffrey Leon, Glastonbury, CT (US); Daniel C. Nadeau, Wethersfield, CT (US); Jeffrey R. Levine, Vernon Rockville, CT (US); Eleanor D. Kaufman, Rocky Hill, CT (US); Richard N. Allen, West Hartford, CT (US); Evan P. Molony, Farmington, CT (US); Gregory Anselmi, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 327 days.

(21) Appl. No.: 15/069,738

(22) Filed: Mar. 14, 2016

(65) Prior Publication Data

US 2017/0260864 A1    Sep. 14, 2017

(51) Int. Cl.
*F01D 5/14* (2006.01)
*F01D 5/18* (2006.01)
(Continued)

(52) U.S. Cl.
CPC ............... *F01D 5/187* (2013.01); *B22C 9/10* (2013.01); *F02C 7/18* (2013.01); *F05D 2220/32* (2013.01);
(Continued)

(58) Field of Classification Search
None
See application file for complete search history.

(56) References Cited

U.S. PATENT DOCUMENTS

| 5,772,397 A | * | 6/1998 | Morris | .................... F01D 5/187 |
| | | | | 415/115 |
| 7,780,414 B1 | * | 8/2010 | Liang | ....................... B22C 9/10 |
| | | | | 164/369 |

(Continued)

FOREIGN PATENT DOCUMENTS

| EP | 1548230 | 6/2005 |
| EP | 1561901 | 8/2005 |
| EP | 2223753 | 9/2010 |

OTHER PUBLICATIONS

Extended European Search Report dated Aug. 17, 2017 in EP Application 17160960.5.

*Primary Examiner* — Igor Kershteyn
*Assistant Examiner* — Jason Fountain
(74) *Attorney, Agent, or Firm* — Snell & Wilmer, L.L.P.

(57) ABSTRACT

An airfoil is disclosed, comprising an airfoil body and an internal cavity within the airfoil body. The internal cavity may comprise an outer edge comprising a first outer scallop and a second outer scallop, an inner edge opposite the outer edge, the inner edge comprising a first inner scallop and a second inner scallop, a leading edge spanning between the outer edge and the inner edge, and a trailing edge spanning between the outer edge and the inner edge and opposite the leading edge. Between the outer edge, the inner edge, the leading edge, and the trailing edge, the internal cavity may comprise eight columns of pedestals disposed axially relative to one another and axially between the leading edge and the trailing edge.

19 Claims, 7 Drawing Sheets

(51) Int. Cl.
*F02C 7/18* (2006.01)
*B22C 9/10* (2006.01)
(52) U.S. Cl.
CPC .. *F05D 2260/20* (2013.01); *F05D 2260/2212* (2013.01); *F05D 2260/22141* (2013.01)

(56) References Cited

U.S. PATENT DOCUMENTS

| | | |
|---|---|---|
| 2013/0280080 A1 | 10/2013 | Levine |
| 2014/0093387 A1* | 4/2014 | Pointon .................. F01D 5/187 416/97 R |
| 2014/0110559 A1 | 4/2014 | Lee |

* cited by examiner

AIRFOIL

FIELD

The present disclosure relates to airfoils for gas turbine engines, and in particular, to airfoils having internal cavities.

BACKGROUND

In gas turbine engines, airfoils, such as rotor blades and stator vanes may include internal cavities in which cooling air is introduced to convectively cool the airfoil. Internal cavities may be formed by a ceramic core during the manufacturing process for airfoils. Cooling air within the internal cavities may be regulated by pedestals disposed within the internal cavities.

SUMMARY

In various embodiments, an airfoil core may comprise an outer diameter surface comprising a first outer scallop mold and a second outer scallop mold, an inner diameter surface opposite the outer diameter surface, the inner diameter surface comprising a first inner scallop mold and a second inner scallop mold, a leading edge between the outer diameter surface and the inner diameter surface, a trailing edge between the outer diameter surface and the inner diameter surface and opposite the leading edge, and a core body enclosed by the outer diameter surface, the inner diameter surface, the leading edge, and the trailing edge. The core body may comprise a first pedestal mold column, a second pedestal mold column axially adjacent to the first pedestal mold column, a third pedestal mold column axially adjacent to the second pedestal mold column, a fourth pedestal mold column axially adjacent to the third pedestal mold column, a fifth pedestal mold column axially adjacent to the fourth pedestal mold column, a sixth pedestal mold column axially adjacent to the fifth pedestal mold column, a seventh pedestal mold column axially adjacent to the sixth pedestal mold column, and an eighth pedestal mold column axially adjacent to the seventh pedestal mold column and the trailing edge.

In various embodiments, the first pedestal mold column may comprise 18 first column pedestal molds, wherein the 18 first column pedestal molds each comprise a first column pedestal mold diameter between a range of 0.070 inch to 0.080 inch. In various embodiments, the second pedestal mold column may comprise 19 second column pedestal molds, wherein the 19 second column pedestal molds each comprise a second column pedestal mold diameter between a range of 0.070 inch to 0.080 inch. In various embodiments, the third pedestal mold column may comprise 18 third column pedestal molds, wherein the 18 third column pedestal molds each comprise a third column pedestal mold diameter between a range of 0.05 inch and 0.07 inch. In various embodiments, the fourth pedestal mold column may comprise 19 fourth column pedestal molds, wherein the 19 fourth column pedestal molds each comprise a fourth column pedestal mold diameter between a range of 0.070 inch to 0.080 inch.

In various embodiments, the fifth pedestal mold column may comprise a fifth column first group extending radially from the inner diameter surface, the fifth column first group comprising 4 fifth column first group pedestal molds each having a fifth column first group diameter between a range of 0.070 inch and 0.080 inch, a fifth column second group extending radially from the fifth column first group, the fifth column second group comprising 3 fifth column second group pedestal molds each having a fifth column second group diameter between a range of 0.070 inch and 0.080 inch, a fifth column third group extending radially from the fifth column second group, the fifth column third group comprising 4 fifth column third group pedestal molds each having a fifth column third group diameter between a range of 0.060 inch and 0.070 inch, a fifth column fourth group extending radially from the fifth column third group, the fifth column fourth group comprising 3 fifth column fourth group pedestal molds each having a fifth column fourth group diameter between a range of 0.070 inch and 0.080 inch, and/or a fifth column fifth group extending radially from the fifth column fifth group and to the outer diameter surface, the fifth column fifth group comprising 4 fifth column fifth group pedestal molds each having a fifth column fifth group diameter between a range of 0.070 inch and 0.080 inch.

In various embodiments, the sixth pedestal mold column may comprise a sixth column first group extending radially from the inner diameter surface, the sixth column first group comprising 7 sixth column first group pedestal molds each having a sixth column first group length between a range of 0.060 inch and 0.070 inch and a sixth column first group width between a range of 0.050 inch and 0.060 inch, a sixth column second group extending radially from the sixth column first group, the sixth column second group comprising 5 sixth column second group pedestal molds each having a sixth column second group diameter between a range of 0.050 inch and 0.060 inch, a sixth column third group extending radially from the sixth column second group, the sixth column third group comprising 10 sixth column third group pedestal molds each having a sixth column third group diameter between a range of 0.040 inch and 0.050 inch, and/or a sixth column fourth group extending radially from the sixth column third group and to the outer diameter surface, the sixth column fourth group comprising 7 sixth column fourth group pedestal molds each having a sixth column fourth group diameter between a range of 0.050 inch and 0.060 inch.

In various embodiments, the seventh pedestal mold column may comprise a seventh column first group extending radially from the inner diameter surface, the seventh column first group comprising 6 seventh column first group pedestal molds each having a seventh column first group length between a range of 0.060 inch and 0.070 inch and a seventh column first group width between a range of 0.050 inch and 0.060 inch, a seventh column second group extending radially from the seventh column first group, the seventh column second group comprising 5 seventh column second group pedestal molds each having a seventh column second group diameter between a range of 0.050 inch and 0.060 inch, a seventh column third group extending radially from the seventh column second group, the seventh column third group comprising 10 seventh column third group pedestal molds each having a seventh column third group diameter of between a range of 0.040 inch and 0.050 inch, and/or a seventh column fourth group extending radially from the seventh column third group and to the outer diameter surface, the seventh column fourth group comprising 7 seventh column fourth group pedestal molds each having a seventh column fourth group diameter between a range of 0.050 inch and 0.060 inch.

In various embodiments, the eighth pedestal mold column may comprise an eighth column first group extending radially from the inner diameter surface, the eighth column first group comprising 7 eighth column first group pedestal molds each having an eighth column first group diameter between a range of 0.05 inch and 0.07 inch, an eighth column second group extending radially from the eighth column first group, the eighth column second group comprising 5 eighth column second group pedestal molds each having an eighth column second group diameter between a range of 0.04 inch and 0.06 inch, an eighth column third group extending radially from the eighth column second group, the eighth column third group comprising 11 eighth column third group pedestal molds each having an eighth column third group diameter between a range of 0.03 inch and 0.05 inch, and/or an eighth column fourth group extending radially from the eighth column third group and to the outer diameter surface, the eighth column fourth group comprising 6 eighth column fourth group pedestal molds each having an eighth column fourth group diameter between a range of 0.04 inch and 0.06 inch.

In various embodiments, an airfoil may comprise an airfoil body and an internal cavity within the airfoil body. The internal cavity may comprise an outer edge comprising a first outer scallop and a second outer scallop, an inner edge opposite the outer edge, the inner edge comprising a first inner scallop and a second inner scallop, a leading edge spanning between the outer edge and the inner edge, and/or a trailing edge spanning between the outer edge and the inner edge and opposite the leading edge. Between the outer edge, the inner edge, the leading edge, and the trailing edge, the internal cavity may comprise a first pedestal column, a second pedestal column axially adjacent to the first pedestal column, a third pedestal column axially adjacent to the second pedestal column, a fourth pedestal column axially adjacent to the third pedestal column, a fifth pedestal column axially adjacent to the fourth pedestal column, a sixth pedestal column axially adjacent to the fifth pedestal column, a seventh pedestal column axially adjacent to the sixth pedestal column, and/or an eighth pedestal column axially adjacent to the seventh pedestal column and the trailing edge.

In various embodiments, the first pedestal column may comprise 18 first column pedestals, wherein the 18 first column pedestals each comprise a first column pedestal diameter between a range of 0.070 inch to 0.080 inch, the second pedestal column may comprise 19 second column pedestals, wherein the 19 second column pedestals each comprise a second column pedestal diameter between a range of 0.070 inch to 0.080 inch, the third pedestal column may comprise 18 third column pedestals, wherein the 18 third column pedestals each comprise a third column pedestal diameter between a range of 0.05 inch and 0.07 inch, and/or the fourth pedestal column may comprise 19 fourth column pedestals, wherein the 19 fourth column pedestals each comprise a fourth column pedestal diameter between a range of 0.070 inch to 0.080 inch.

In various embodiments, the fifth pedestal column may comprise a fifth column first group extending radially from the inner edge, the fifth column first group comprising 4 fifth column first group pedestals each having a fifth column first group diameter between a range of 0.070 inch to 0.080 inch, a fifth column second group extending radially from the fifth column first group, the fifth column second group comprising 3 fifth column second group pedestals each having a fifth column second group diameter between a range of 0.070 inch to 0.080 inch, a fifth column third group extending radially from the fifth column second group, the fifth column third group comprising 4 fifth column third group pedestals each having a fifth column third group diameter between a range of 0.060 inch and 0.070 inch, a fifth column fourth group extending radially from the fifth column third group, the fifth column fourth group comprising 3 fifth column fourth group pedestals each having a fifth column fourth group diameter between a range of 0.070 inch to 0.080 inch, and/or a fifth column fifth group extending radially from the fifth column fifth group and to the outer edge, the fifth column fifth group comprising 4 fifth column fifth group pedestals each having a fifth column fifth group diameter between a range of 0.070 inch to 0.080 inch.

In various embodiments, the sixth pedestal column may comprise a sixth column first group extending radially from the inner edge, the sixth column first group comprising 7 sixth column first group pedestals each having a sixth column first group length between a range of 0.060 inch and 0.070 inch and a sixth column first group width between a range of 0.050 inch and 0.060 inch, a sixth column second group extending radially from the sixth column first group, the sixth column second group comprising 5 sixth column second group pedestals each having a sixth column second group diameter between a range of 0.050 inch and 0.060 inch, a sixth column third group extending radially from the sixth column second group, the sixth column third group comprising 10 sixth column third group pedestals each having a sixth column third group diameter between a range of 0.040 inch and 0.050 inch, and/or a sixth column fourth group extending radially from the sixth column third group and to the outer edge, the sixth column fourth group comprising 7 sixth column fourth group pedestals each having a sixth column fourth group diameter between a range of 0.050 inch and 0.060 inch.

In various embodiments, the seventh pedestal column may comprise a seventh column first group extending radially from the inner edge, the seventh column first group comprising 6 seventh column first group pedestals each having a seventh column first group length between a range of 0.060 inch and 0.070 inch and a seventh column first group width between a range of 0.050 inch and 0.060 inch, a seventh column second group extending radially from the seventh column first group, the seventh column second group comprising 5 seventh column second group pedestals each having a seventh column second group diameter between a range of 0.050 inch and 0.060 inch, a seventh column third group extending radially from the seventh column second group, the seventh column third group comprising 10 seventh column third group pedestals each having a seventh column third group diameter between a range of 0.040 inch and 0.050 inch, and/or a seventh column fourth group extending radially from the seventh column third group and to the outer edge, the seventh column fourth group comprising 7 seventh column fourth group pedestals each having a seventh column fourth group diameter between a range of 0.050 inch and 0.060 inch.

In various embodiments, the eighth pedestal column may comprise an eighth column first group extending radially from the inner edge, the eighth column first group comprising 7 eighth column first group pedestals each having an eighth column first group diameter between a range of 0.05 inch and 0.07 inch, an eighth column second group extending radially from the eighth column first group, the eighth column second group comprising 5 eighth column second group pedestals each having an eighth column second group diameter between a range of 0.04 inch and 0.06 inch, an eighth column third group extending radially from the eighth column second group, the eighth column third group comprising 11 eighth column third group pedestals each having an eighth column third group diameter between a range of 0.03 inch and 0.05 inch, and/or an eighth column fourth group extending radially from the eighth column third group and to the outer edge, the eighth column fourth group comprising 6 eighth column fourth group pedestals each having an eighth column fourth group diameter between a range of 0.04 inch and 0.06 inch.

In various embodiments, the first pedestal column may comprise a first column pitch between each of the 18 first column pedestals that is between a range of 0.140 inch and 0.190 inch. In various embodiments, the second pedestal column may comprise a second column pitch between each of the 19 second column pedestals that is between a range of 0.140 inch and 0.190 inch, and/or the third pedestal column may comprise a third column pitch between each of the 18 third column pedestals is between a range of 0.140 inch and 0.190 inch. In various embodiments, the fourth pedestal column may comprise a fourth column pitch between each of the 18 fourth column pedestals that is between a range of 0.140 inch and 0.190 inch.

In various embodiments, the fifth column first group may comprise a fifth column first group pitch between each of the 4 fifth column first group pedestals that is between a range of 0.140 inch and 0.150 inch, the fifth column second group may comprise a fifth column second group pitch between each of the 3 fifth column second group pedestals that is between a range of 0.140 inch and 0.160 inch, the fifth column third group may comprise a fifth column third group pitch between each of the 4 fifth column third group pedestals that is between a range of 0.150 inch and 0.190 inch, the fifth column fourth group may comprise a fifth column fourth group pitch between each of the 3 fifth column fourth group pedestals that between a range of 0.160 inch and 0.170 inch, and/or the fifth column fifth group may comprise a fifth column fifth group pitch between each of the 4 fifth column fifth group pedestals that is between a range of 0.140 inch and 0.150 inch.

In various embodiments, the sixth column first group may comprise a sixth column first group pitch between each of the 7 sixth column first group pedestals that is between a range of 0.100 inch and 0.110 inch, the sixth column second group may comprise a sixth column second group pitch between each of the 5 sixth column second group pedestals that is between a range of 0.100 inch and 0.110 inch, the sixth column third group may comprise a sixth column third group pitch between each of the 10 sixth column third group pedestals that is between a range of 0.100 inch and 0.110 inch, and/or the sixth column fourth group may comprise a sixth column fourth group pitch between each of the 7 sixth column fourth group pedestals that is between a range of 0.100 inch and 0.110 inch.

In various embodiments, the seventh column first group may comprise a seventh column first group pitch between each of the 6 seventh column first group pedestals that is between a range of 0.100 inch and 0.110 inch, the seventh column second group may comprise a seventh column second group pitch between each of the 5 seventh column second group pedestals that is between a range of 0.100 inch and 0.110 inch, the seventh column third group may comprise a seventh column third group pitch between each of the 10 seventh column third group pedestals that is between a range of 0.100 inch and 0.110 inch, and/or the seventh column fourth group may comprise a seventh column fourth group pitch between each of the 7 seventh column fourth group pedestals that is between a range of 0.100 inch and 0.110 inch.

In various embodiments, the eighth column first group may comprise an eighth column first group pitch between each of the 7 eighth column first group pedestals that is between a range of 0.100 inch and 0.110 inch, the eighth column second group may comprise an eighth column second group pitch between each of the 5 eighth column second group pedestals that is between a range of 0.100 inch and 0.110 inch, the eighth column third group may comprise an eighth column third group pitch between each of the 11 eighth column third group pedestals that between a range of 0.100 inch and 0.110 inch, and/or the eighth column fourth group may comprise an eighth column fourth group pitch between each of the 6 eighth column fourth group pedestals that is between a range of 0.100 inch and 0.110 inch.

In various embodiments, a gas turbine engine may comprise a high pressure turbine comprising an airfoil. The airfoil may comprise an internal cavity within an airfoil body. The internal cavity may comprise an outer edge comprising a first outer scallop and a second outer scallop, an inner edge opposite the outer edge, the inner edge comprising a first inner scallop and a second inner scallop, a leading edge spanning between the outer edge and the inner edge, and/or a trailing edge spanning between the outer edge and the inner edge and opposite the leading edge. Between the outer edge, the inner edge, the leading edge, and the trailing edge, the internal cavity may comprise a first pedestal column, a second pedestal column axially adjacent to the first pedestal column, a third pedestal column axially adjacent to the second pedestal column, a fourth pedestal column axially adjacent to the third pedestal column, a fifth pedestal column axially adjacent to the fourth pedestal column, a sixth pedestal column axially adjacent to the fifth pedestal column, a seventh pedestal column axially adjacent to the sixth pedestal column, and/or an eighth pedestal column disposed axially between the seventh pedestal column and the trailing edge.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

All ranges may include the upper and lower limit values, and all ranges and ratio limits disclosed herein may be combined. It is to be understood that unless specifically stated otherwise, references to "a," "an," and/or "the" may include one or more than one and that reference to a component or step in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
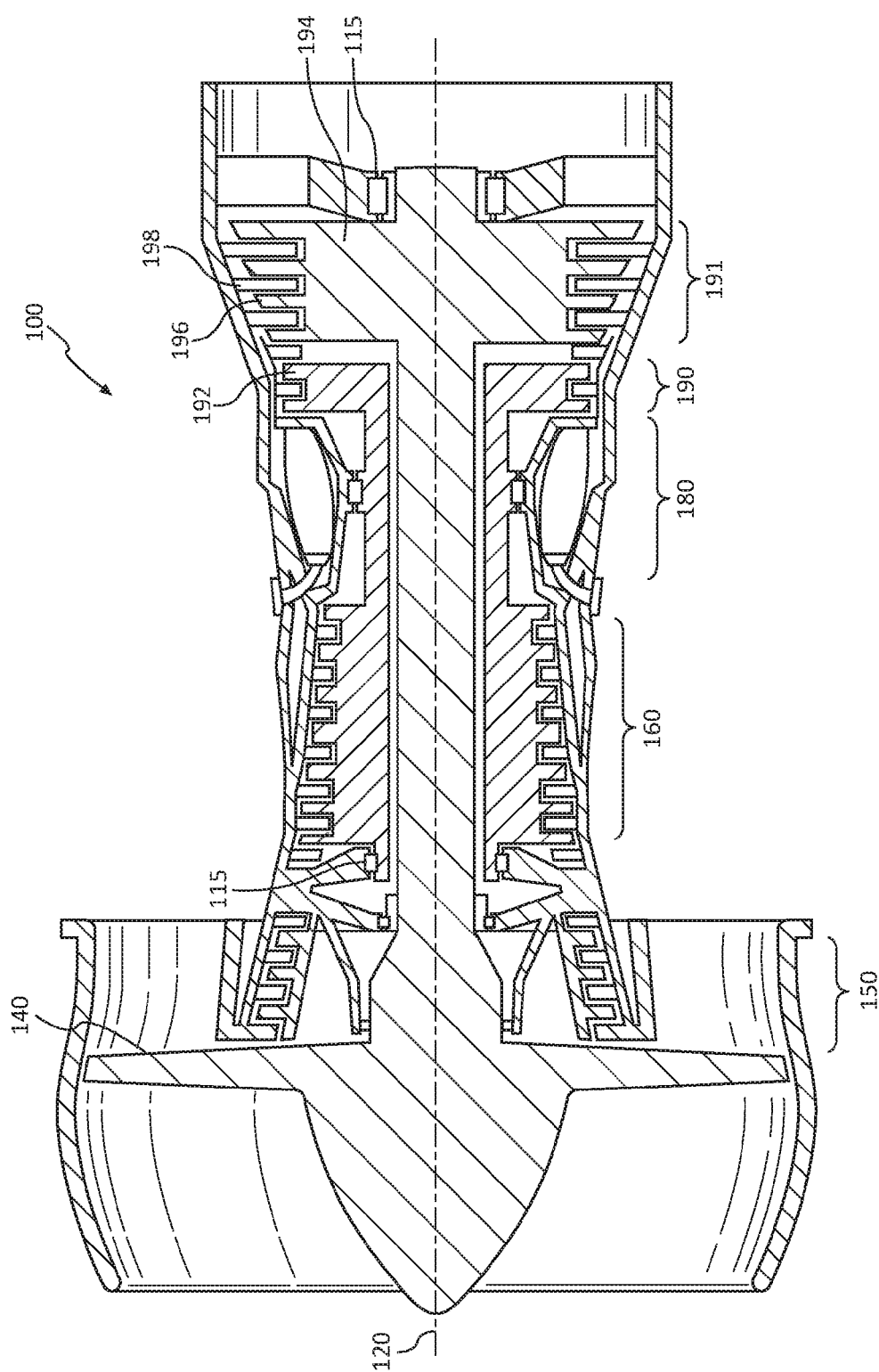
FIG. 1 depicts a cross-sectional view of a gas turbine engine, in accordance with various embodiments.

Referring to FIG. 1, a gas turbine engine 100 is illustrated according to various embodiments. Gas turbine engine 100 is disposed about axis of rotation 120. Gas turbine engine 100 may comprise a fan 140, compressor sections 150 and 160, a combustion section 180, and turbine sections 190, 191. Air compressed in compressor sections 150, 160 may be mixed with fuel and burned in combustion section 180 and expanded across turbine sections 190, 191. Turbine sections 190, 191 may include high pressure rotors 192 and low pressure rotors 194, which rotate in response to the expansion. Turbine sections 190, 191 may comprise alternating rows of rotary airfoils or blades 196 and static airfoils or vanes 198. A plurality of bearings 115 may support spools to which the rotors are affixed in gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Operating conditions in turbine sections 190, 191, especially in high pressure turbine 190, may be extremely hot (e.g., 1000° F./537° C. to 2000° F./1093° C. or higher). As noted above and with reference to FIG. 1, airfoils, such as blades 196 and/or vanes 198, may be subject to a high external heat load.

Figure 2:
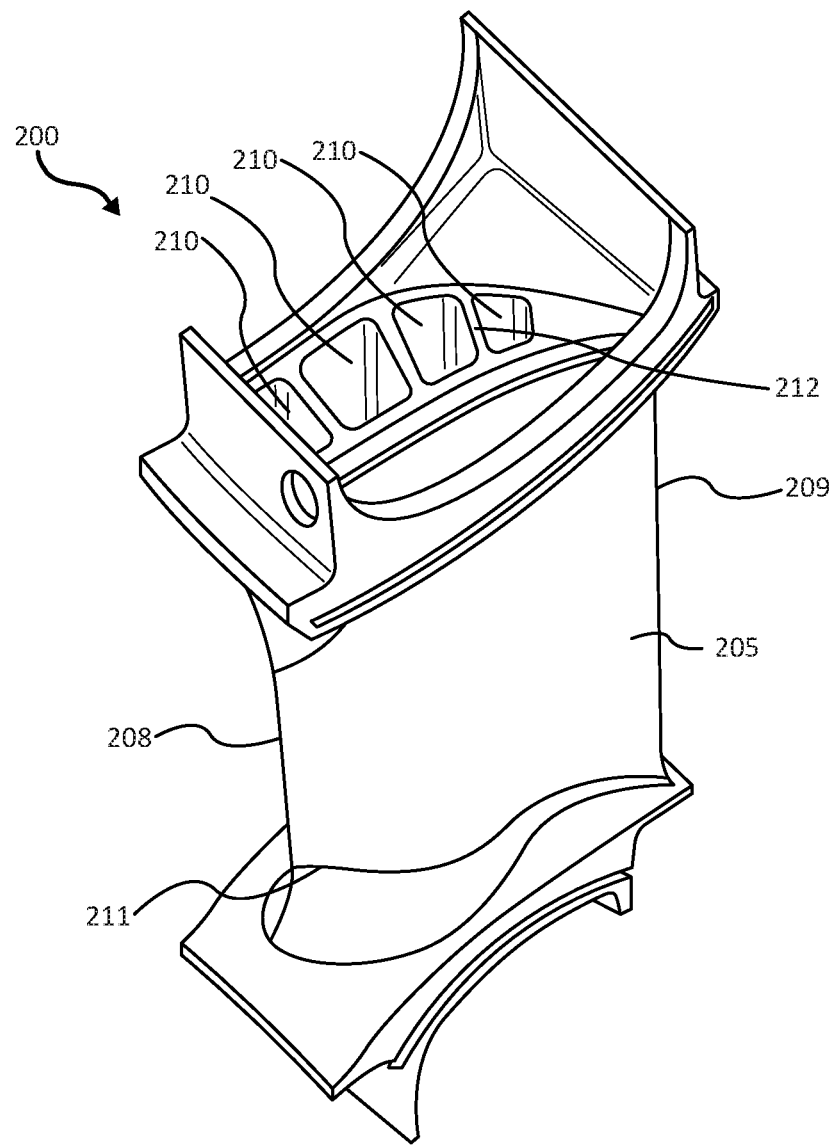
FIG. 2 depicts a perspective view of an airfoil, in accordance with various embodiments.
Figure 3:
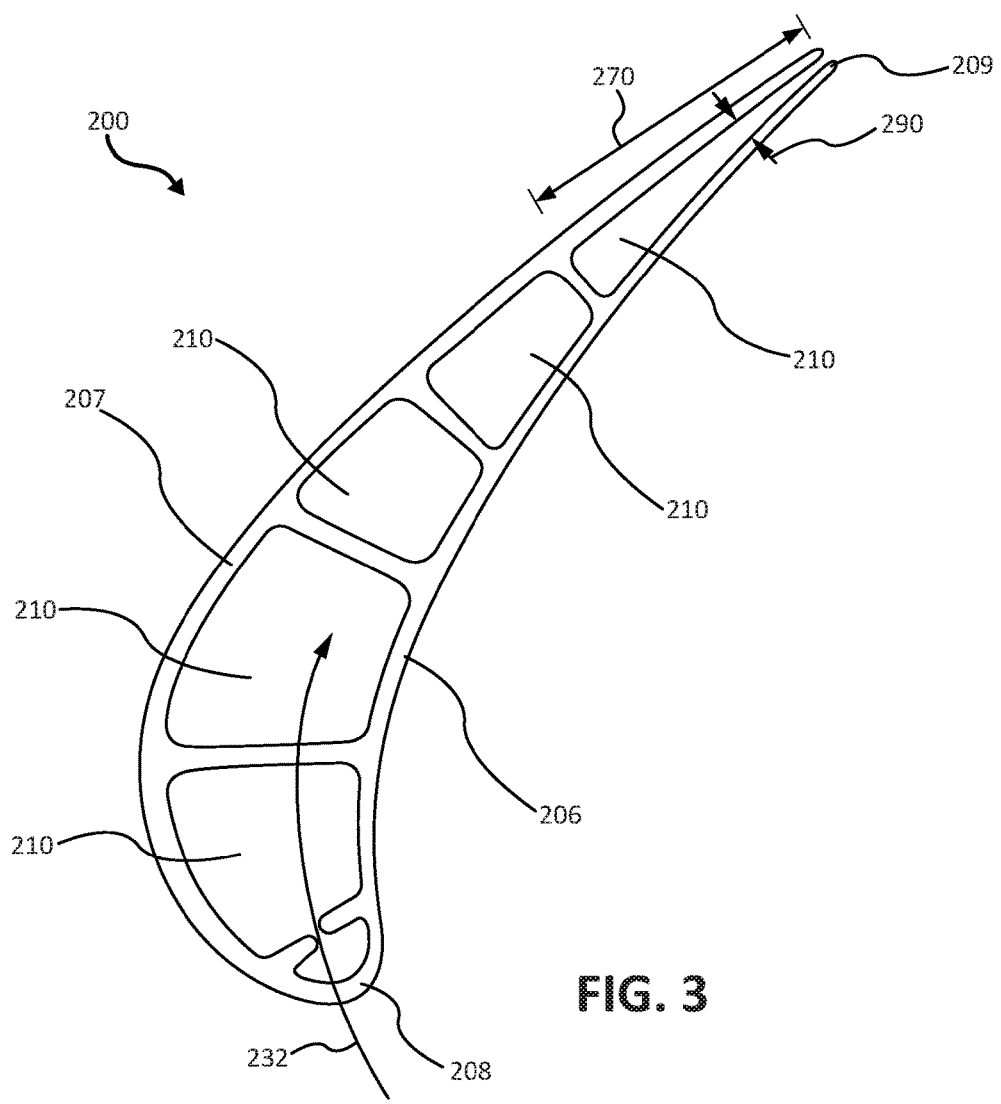
FIG. 3 depicts a horizontal cross sectional view of an airfoil, in accordance with various embodiments.
Figure 4:
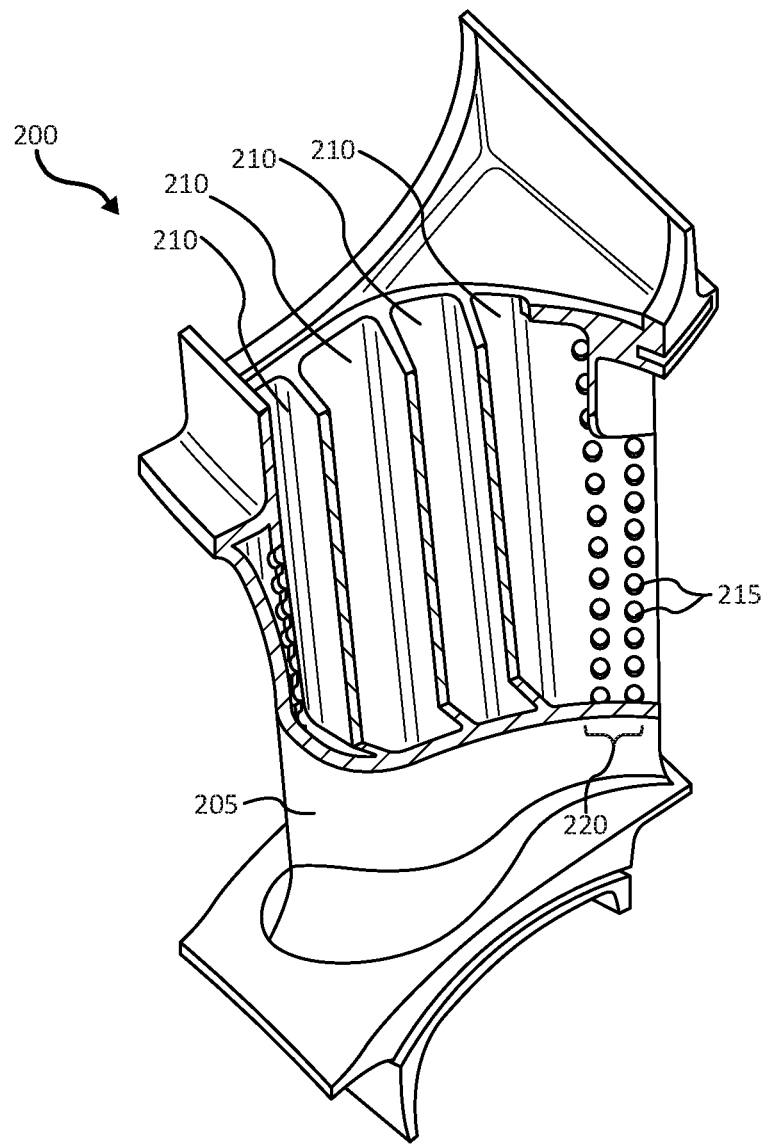
FIG. 4 depicts a vertical cross sectional view of an airfoil, in accordance with various embodiments.

As such, airfoils, such as blades 196 and/or vanes 198, may comprise internal cavities to allow cooling airflow through the airfoils and conduct heat away from the airfoils. As depicted in FIGS. 2-4, elements with the like element numbering, are intended to be the same and will not be repeated for the sake of clarity.

With reference to FIGS. 2 and 3, in accordance with various embodiments, an airfoil, such as vane 200 in a high pressure turbine of a gas turbine engine, may comprise a vane body 205, a pressure surface 206, a suction surface 207, a leading edge 208, a trailing edge 209, and/or one or more internal cavities 210 disposed within vane body 205. Leading edge 208 and/or trailing edge 209 may also refer to portions of internal cavity 210. Internal cavities 210 may be integral with each other, forming one internal cavity 210, or internal cavities 210 may form a suitable number of separate internal cavities 210 within vane body 205. In various embodiments, internal cavities 210 may comprise an inner edge 211 and/or an outer edge 212. With momentary combined reference to FIG. 1, inner edge 211 may be the most radially inward portion of vane 200 and/or internal cavity 210 relative to axis of rotation 120, and/or outer edge 212 may be the most radially outward portion of vane 200 and/or internal cavity 210 relative to axis of rotation 120.

Referring to FIG. 4, in accordance with various embodiments, pedestals 215 may be disposed within internal cavities 210. In various embodiments, pedestals 215 may be disposed in any of internal cavities 210 and/or in any part of internal cavities 210. Pedestals 215 may be structures comprised of material comprised in vane 200. Pedestals 215 may span between pressure surface 206 and suction surface 207 within internal cavities 210 or partially from pressure surface 206 and/or suction surface 207 into internal cavities 210 without reaching the suction surface 207 and/or pressure surface, respectively. Pedestals may be configured to cause more surface area of vane 200 to contact cooling airflow 232 and/or regulate the flow of cooling airflow 232 (depicted in FIG. 3) within vane 200.

In various embodiments, with reference to FIGS. 3 and 4, the thickness 290 at a length 270 from trailing edge 209 of internal cavity 210 may be adjusted in order to achieve a desired flow pattern and/or flow rate (i.e., volume per unit time) of cooling airflow 232. In various embodiments, a desired flow pattern and/or flow rate of cooling airflow 232 may be achieved by varying the shape, size, and/or arrangement of pedestals 215. Pedestals 215 may be disposed in pedestal columns 220 in internal cavity 210

Figure 5A:
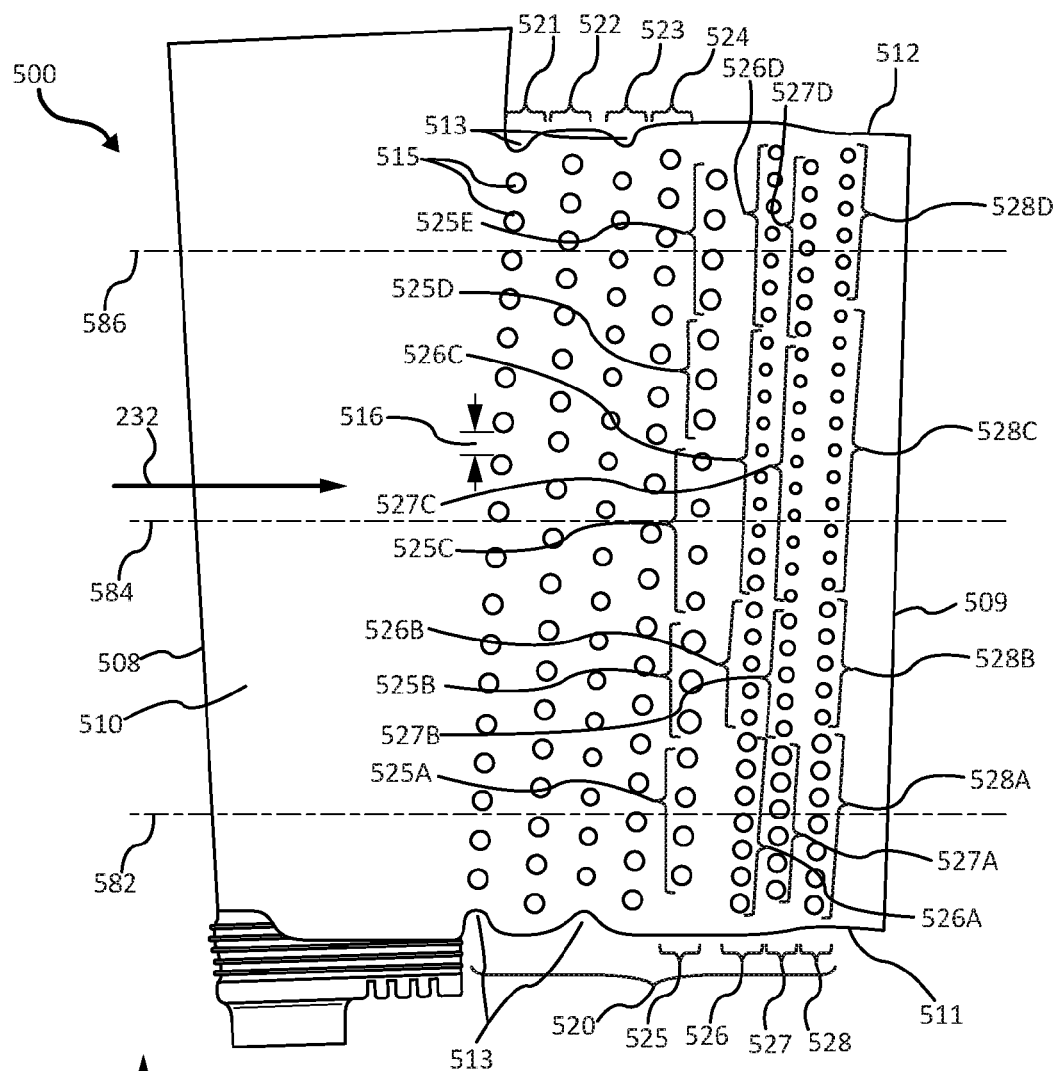
FIG. 5A depicts a perspective view of an airfoil core, in accordance with various embodiments.
Figure 5B:
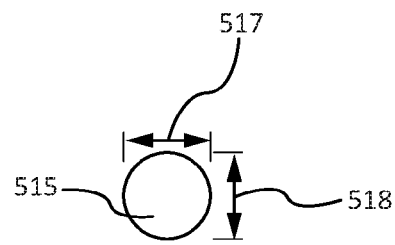
FIG. 5B depicts a perspective view of a pedestal mold, in accordance with various embodiments.
Figure 5C:
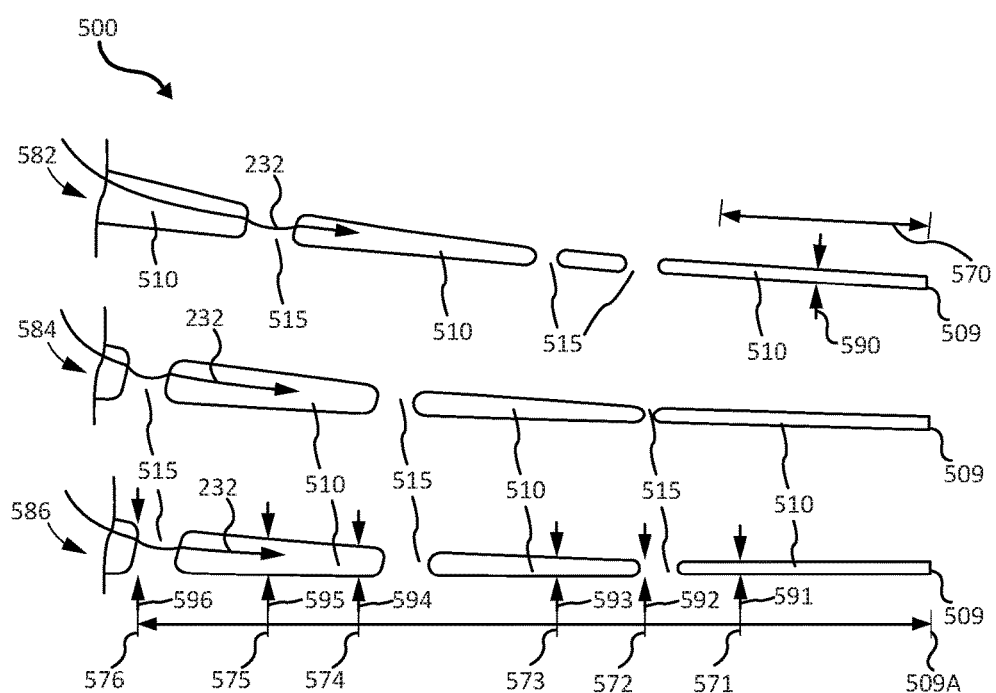
FIG. 5C depicts cross sectional views of an airfoil core, in accordance with various embodiments.

In various embodiments, with additional reference to FIGS. 5A-C, internal cavity 210 may be formed during the manufacturing process using a vane core 500. Vane core 500 may comprise a core body 510, a leading edge 508, a trailing edge 509, an inner diameter surface 511, an outer diameter surface 512, and/or pedestal molds 515, which may form internal cavity 210, leading edge 208 of internal cavity 210, trailing edge 209 of internal cavity 210, inner edge 211 of internal cavity 210, outer edge 212 of internal cavity 210, and/or pedestals 215 of internal cavity 210, respectively, (depicted in FIGS. 2-4) during the manufacturing of vane 200. As used herein, "radially" means along radial axis 501 and "axially" means along axial axis 502. With momentary combined reference to FIG. 1, inner diameter surface 511 may be the most radially inward portion of vane core 500 from axis of rotation 120, and/or outer diameter surface 512 may be the most radially outward portion of vane core 500 from axis of rotation 120. Pedestal molds 515 may be arranged in pedestal mold columns 520, which will form pedestals 215 and pedestal columns 220 (depicted in FIG. 4), respectively, during the manufacturing of vane 200. Pedestal molds 515 (and pedestals 215) may comprise a length 518 and a width 517, and the pedestal molds 515 (and pedestals 215) may vary in size throughout the vane core 500 (and internal cavity 210). Length 518 and/or width 517 may serve as the pedestal mold (or pedestal) diameter for pedestal molds 515 having a circular cross section, but pedestals molds 515 (and/or pedestals 215) may have any suitable cross sectional shape (e.g., triangular, rectangular, oval, etc.). The radial distance between any two pedestal molds 515 (or pedestals 215) within a pedestal mold column 520 (or pedestal column 220) may be referred to as the pitch 516 (or pitch 216, in FIG. 6) between the pedestal molds 515 (or pedestals 215).

When discussing vane core 500 herein, the discussion of vane core body 510, scallop molds 513, pedestal molds 515, and/or pedestal mold columns 520 regarding arrangement (pitch, grouping, etc.), size (length, width, diameter, etc.), etc. may also apply to internal cavity 210, scallops 213, pedestals 215, and/or pedestal columns 220 of vane 200, respectively. Similarly, inner diameter surface 511 and outer diameter surface 512 of vane core 500 and/or vane core body 510 may correspond to inner edge 211 and outer edge 212, respectively, of internal cavity 210. Furthermore, leading edge 508 and/or trailing edge 509 of vane core 500 and/or vane core body 510 may correspond to leading edge 208 and/or trailing edge 209, respectively, of internal cavity 210. Overall, a description of vane core 500 and/or vane core body 510 also serves as a description of internal cavity 210, and vice versa.

Figure 6:
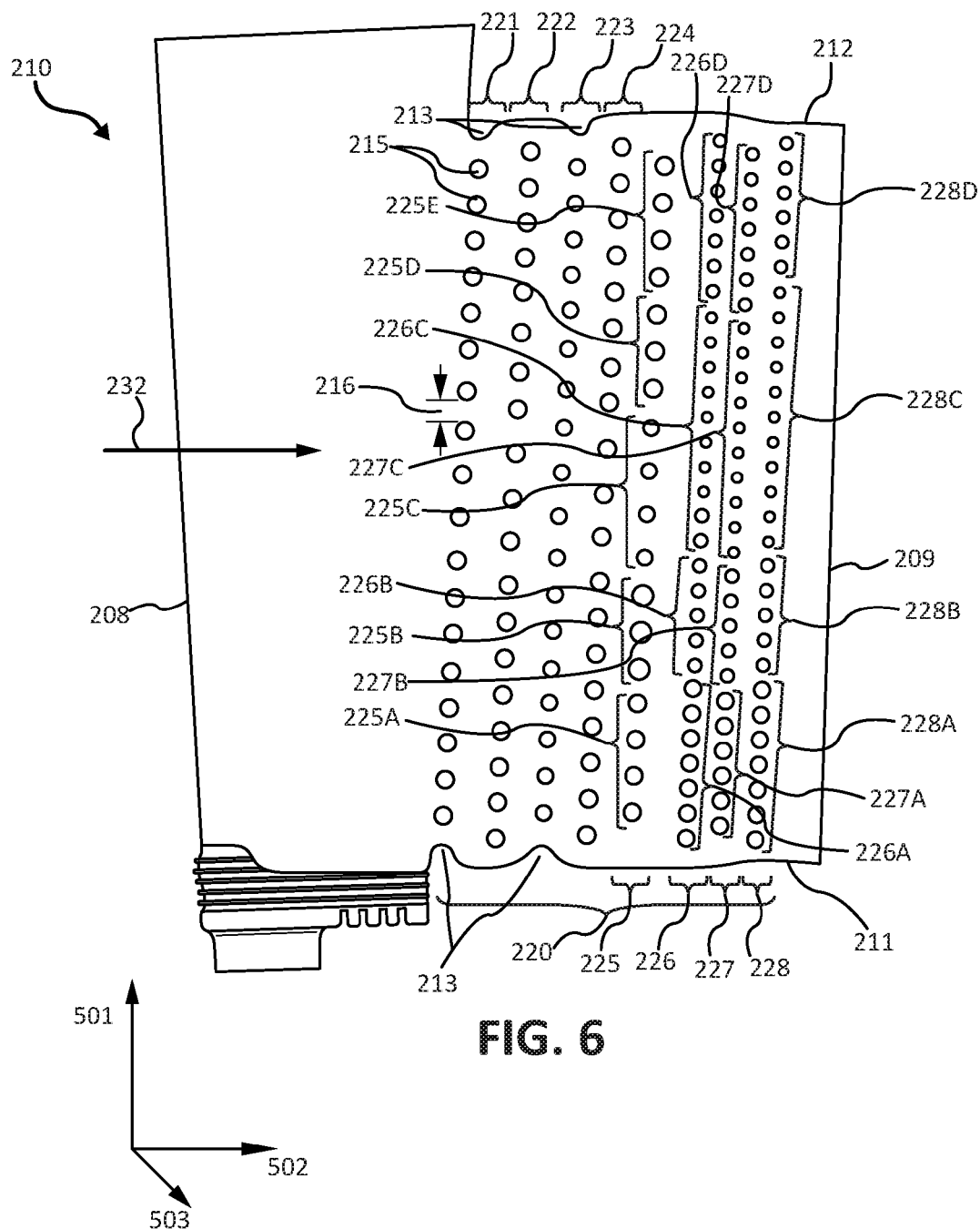
FIG. 6 depicts a perspective view of an internal cavity of an airfoil, in accordance with various embodiments.

In accordance with various embodiments, FIG. 6 depicts an internal cavity 210 of a vane 200, which may be formed during the manufacturing process by vane core 500, depicted in FIG. 5A. In various embodiments, vane 200 may comprise a scallop 213 disposed on inner edge 211 of internal cavity 210 and/or outer edge 212 of internal cavity 210. In various embodiments, inner edge 211 and/or outer edge 212 of internal cavity 210 may comprise two scallops 213 each, or any suitable number of scallops 213. In various embodiments, internal cavity 210 may comprise eight pedestal columns 220 between leading edge 208 and trailing edge 209, with pedestals 215 spanning radially in each pedestal column 220. The eight pedestal columns 220 may comprise a first pedestal column 221, a second pedestal column 222 axially adjacent to first pedestal column 221, a third pedestal column 223 axially adjacent to second pedestal column 222, a fourth pedestal column 224 axially adjacent to third pedestal column 223, a fifth pedestal column 225 axially adjacent to fourth pedestal column 224, a sixth pedestal column 226 axially adjacent to fifth pedestal column 225, a seventh pedestal column 227 axially adjacent to sixth pedestal column 226, and an eighth pedestal column 228 axially adjacent to seventh pedestal column 227.

In various embodiments, first pedestal column 221 may comprise 18 first column pedestals. Each pedestal 215 of the first column pedestals may comprise a circular shape and have a first column pedestal diameter between a range of 0.070 inch (0.178 cm) to 0.080 (0.203 cm). In various embodiments, each pedestal 215 of the first column pedestals may comprise a circular shape and have a first column pedestal diameter 0.075 inch (0.19 cm). In various embodiments, a first column pitch between each of the first column pedestals may be between a range of 0.140 inch (0.356 cm) to 0.190 inch (0.483 cm). In various embodiments, the first column pitch between each of the first column pedestals may be between a range of 0.149 inch (0.378 cm) and 0.180 inch (0.457 cm).

In various embodiments, second pedestal column 222 may comprise 19 second column pedestals. Each pedestal 215 of the second column pedestals may comprise a circular shape and have a second column pedestal diameter between a range of 0.070 inch (0.178 cm) and 0.080 inch (0.203 cm). In various embodiments, each pedestal 215 of the second column pedestals may comprise a circular shape and have a second column pedestal diameter of 0.072 inch (0.18 cm). A second column pitch between each of the second column pedestals may be between a range of 0.140 inch (0.356 cm) to 0.190 inch (0.483 cm). In various embodiments, the second column pitch between each of the second column pedestals may be between a range of 0.149 inch (0.378 cm) and 0.180 inch (0.457 cm).

In various embodiments, third pedestal column 223 may comprise 18 third column pedestals. Each pedestal 215 of the third column pedestals may comprise a circular shape and have a third column pedestal diameter between a range of 0.05 inch (0.127 cm) and 0.07 inch (0.179 cm). In various embodiments, each pedestal 215 of the third column pedestals may comprise a circular shape and have a third column pedestal diameter of 0.06 inch (0.152 cm). A third column pitch between each of the third column pedestals may be between a range of 0.140 inch (0.356 cm) and 0.190 inch (0.483 cm). In various embodiments, the third column pitch between each of the third column pedestals may be between a range of 0.149 inch (0.378 cm) and 0.180 inch (0.457 cm).

In various embodiments, fourth pedestal column 224 may comprise 19 fourth pedestals. Each pedestal 215 of the fourth column pedestals may comprise a circular shape and have a fourth column pedestal diameter between a range of 0.070 inch (0.178 cm) and 0.080 inch (0.203 cm). In various embodiments, each pedestal 215 of the fourth column pedestals may comprise a circular shape and have a fourth column pedestal diameter of 0.073 inch (0.185 cm). A fourth column pitch between each of the third column pedestals may be between a range of 0.140 inch (0.356 cm) and 0.190 inch (0.483 cm). In various embodiments, the fourth column pitch between each of the third column pedestals may be between a range of 0.148 inch (0.376 cm) and 0.188 inch (0.478 cm).

In various embodiments, fifth pedestal column 225 may comprise a fifth column first group 225A with 4 pedestals 215 extending radially in a direction substantially perpendicular from inner edge 211, a fifth column second group 225B with 3 pedestals 215 extending radially from fifth column first group 225A, a fifth column third group 225C with 4 pedestals extending radially from fifth column second group 225B, a fifth column fourth group 225D with 3 pedestals 215 extending radially from fifth column third group 225C, and/or a fifth column fifth group 225E with 4 pedestals 215 extending radially from fifth column fourth group 225D and in a direction substantially perpendicular to outer edge 212.

In various embodiments, each pedestal 215 in fifth column first group 225A may comprise a circular shape and have a fifth column first group diameter between a range of 0.070 inch (0.178 cm) and 0.080 inch (0.203 cm). In various embodiments, each pedestal 215 in fifth column first group 225A may comprise a circular shape and have a fifth column first group diameter of 0.076 inch (0.193 cm). A fifth column first group pitch between each of the pedestals 215 in fifth column first group 225A may be between a range of 0.140 inch (0.356 cm) and 0.150 inch (0.381 cm). In various embodiments, the fifth column first group pitch between each of the pedestals 215 in fifth column first group 225A may be 0.148 inch (0.376 cm). In various embodiments, each pedestal 215 in fifth column second group 225B may comprise a circular shape and have a fifth column second group diameter between a range of 0.070 inch (0.178 cm) and 0.080 inch (0.203 cm). In various embodiments, each pedestal 215 in fifth column second group 225B may comprise a circular shape and have a fifth column second group diameter of 0.073 inch (0.185 cm). A fifth column second group pitch between each of the pedestals 215 in fifth column second group 225B may be between a range of 0.140 inch (0.356 cm) and 0.160 (0.406 cm). In various embodiments, the fifth column second group pitch between each of the pedestals 215 in fifth column second group 225B may be between a range of 0.148 inch (0.376 cm) and 0.155 inch (0.394 cm). In various embodiments, each pedestal 215 in fifth column third group 225C may comprise a circular shape and have a fifth column third group diameter between a range of 0.060 inch (0.152 cm) and 0.070 inch (0.178 cm). In various embodiments, each pedestal 215 in fifth column third group 225C may comprise a circular shape and have a fifth column third group diameter of 0.063 inch (0.160 cm). A fifth column third group pitch between each of the pedestals 215 in fifth column third group 225C may be between a range of 0.150 inch (0.381 cm) and 0.190 inch (0.483 cm). In various embodiments, the fifth column third group pitch between each of the pedestals 215 in fifth column third group 225C may be between a range of 0.155 inch (0.394 cm) and 0.18 inch (0.457 cm). In various embodiments, each pedestal 215 in fifth column fourth group 225D may comprise a circular shape and have a fifth column fourth group diameter between a range of 0.070 inch (0.178 cm) and 0.080 inch (0.203 cm). In various embodiments, each pedestal 215 in fifth column fourth group 225D may comprise a circular shape and have a fifth column fourth group diameter of 0.073 inch (0.185 cm). A fifth column fourth group pitch between each of the pedestals 215 in fifth column fourth group 225D may be between a range of 0.160 inch (0.406 cm) and 0.170 inch (0.432 cm). In various embodiments, the fifth column fourth group pitch between each of the pedestals 215 in fifth column fourth group 225D may be 0.165 inch (0.419 cm). In various embodiments, each pedestal 215 in fifth column fifth group 225E may comprise a circular shape and have a fifth column fifth group diameter between a range of 0.070 inch (0.178 cm) and 0.080 inch (0.203 cm). In various embodiments, each pedestal 215 in fifth column fifth group 225E may comprise a circular shape and have a fifth column fifth group diameter of 0.076 inch (0.193 cm). A fifth column fifth group pitch between each of the pedestals 215 in fifth column fifth group 225E may be between a range of 0.140 inch (0.356 cm) and 0.150 inch (0.381 cm). In various embodiments, the fifth column fifth group pitch between each of the pedestals 215 in fifth column fifth group 225E may be 0.148 inch (0.376 cm).

In various embodiments, sixth pedestal column 226 may comprise a sixth column first group 226A with 7 pedestals 215 extending radially in a direction substantially perpendicular from inner edge 211, a sixth column second group 226B with 5 pedestals 215 extending radially from sixth column first group 226A, a sixth column third group 226C with 10 pedestals 215 extending radially from sixth column second group 226B, and/or a sixth column fourth group 226D with 7 pedestals 215 extending radially from sixth column third group 226C in a direction substantially perpendicular to outer edge 212.

In various embodiments, each pedestal 215 in sixth column first group 226A may comprise an oval shape and have a sixth column first group length between a range of 0.060 inch (0.152 cm) and 0.070 inch (0.178 cm) and a sixth column first group width between a range of 0.050 inch (0.127 cm) and 0.060 inch (0.152 cm). In various embodiments, each pedestal 215 in sixth column first group 226A may comprise an oval shape and have a sixth column first group length of 0.063 inch (0.160 cm) and a sixth column first group width of 0.055 inch (0.140 cm). A sixth column first group pitch between each of the pedestals 215 in sixth column first group 226A may be between a range of 0.100 inch (0.254 cm) and 0.110 inch (0.279 cm). In various embodiments, the sixth column first group pitch between each of the pedestals 215 in sixth column first group 226A may be 0.102 inch (0.259 cm). In various embodiments, each pedestal 215 in sixth column second group 226B may comprise a circular shape and have a sixth column second group diameter between a range of 0.050 inch (0.127 cm) and 0.060 inch (0.152 cm). In various embodiments, each pedestal 215 in sixth column second group 226B may comprise a circular shape and have a sixth column second group diameter of 0.055 inch (0.140 cm). A sixth column second group pitch between each of the pedestals 215 in sixth column second group 226B may be between a range of 0.100 inch (0.254 cm) and 0.110 inch (0.279 cm). In various embodiments, the sixth column second group pitch between each of the pedestals 215 in sixth column second group 226B may be 0.103 inch (0.261 cm). In various embodiments, each pedestal 215 in sixth column third group 226C may comprise a circular shape and have a sixth column third group diameter between a range of 0.040 inch (0.102 cm) and 0.050 inch (0.127 cm). In various embodiments, each pedestal 215 in sixth column third group 226C may comprise a circular shape and have a sixth column third group diameter of 0.045 inch (0.114 cm). A sixth column third group pitch between each of the pedestals 215 in sixth column third group 226C may be between a range of 0.100 inch (0.254 cm) and 0.110 inch (0.279 cm). In various embodiments, the sixth column third group pitch between each of the pedestals 215 in sixth column third group 226C may be 0.103 inch (0.114 cm). In various embodiments, each pedestal 215 in sixth column fourth group 226D may comprise a circular shape and have a sixth column fourth group diameter between a range of 0.050 inch (0.127 cm) and 0.060 inch (0.152 cm). In various embodiments, each pedestal 215 in sixth column fourth group 226D may comprise a circular shape and have a sixth column fourth group diameter of 0.055 inch (0.140 cm). A sixth column fourth group pitch between each of the pedestals 215 in sixth column fourth group 226D may be between a range of 0.100 inch (0.254 cm) and 0.110 inch (0.279 cm). In various embodiments, the sixth column fourth group pitch between each of the pedestals 215 in sixth column fourth group 226D may be 0.102 inch (0.259 cm).

In various embodiments, seventh pedestal column 227 may comprise a seventh column first group 227A with 6 pedestals 215 extending radially in a direction substantially perpendicular from inner edge 211, a seventh column second group 227B with 5 pedestals 215 extending radially from seventh column first group 227A, a seventh column third group 227C with 10 pedestals 215 extending radially from seventh column second group 227B, and/or a seventh column fourth group 227D with 7 pedestals 215 extending radially from seventh column third group 227C in a direction substantially perpendicular to outer edge 212.

In various embodiments, each pedestal 215 in seventh column first group 227A may comprise an oval shape and have a seventh column first group length between a range of 0.060 inch (0.152 cm) and 0.070 inch (0.178 cm) and a seventh column first group width between a range of 0.050 inch (0.127 cm) and 0.060 inch (0.152 cm). In various embodiments, each pedestal 215 in seventh column first group 227A may comprise an oval shape and have a seventh column first group length of 0.063 inch (0.160 cm) and a seventh column first group width of 0.055 inch (0.140 cm). A seventh column first group pitch between each of the pedestals 215 in seventh column first group 227A may be between a range of 0.100 inch (0.254 cm) and 0.110 inch (0.279 cm). In various embodiments, the seventh column first group pitch between each of the pedestals 215 in seventh column first group 227A may be 0.103 inch (0.261 cm). In various embodiments, each pedestal 215 in seventh column second group 227B may comprise a circular shape and have a seventh column second group diameter between a range of 0.050 inch (0.127 cm) and 0.060 inch (0.152 cm). In various embodiments, each pedestal 215 in seventh column second group 227B may comprise a circular shape and have a seventh column second group diameter of 0.055 inch (0.140 cm). A seventh column second group pitch between each of the pedestals 215 in seventh column second group 227B may be between a range of 0.100 inch (0.254 cm) and 0.110 inch (0.279 cm). In various embodiments, the seventh column second group pitch between each of the pedestals 215 in seventh column second group 227B may be 0.103 inch (0.261 cm). In various embodiments, each pedestal 215 in seventh column third group 227C may comprise a circular shape and have a seventh column third group diameter between a range of 0.040 inch (0.102 cm) and 0.050 inch (0.127 cm). In various embodiments, each pedestal 215 in seventh column third group 227C may comprise a circular shape and have a seventh column third group diameter of 0.045 inch (0.114 cm). A seventh column third group pitch between each of the pedestals 215 in seventh column third group 227C may be between a range of 0.100 inch (0.254 cm) and 0.110 inch (0.279 cm). In various embodiments, the seventh column third group pitch between each of the pedestals 215 in seventh column third group 227C may be 0.103 inch (0.114 cm). In various embodiments, each pedestal 215 in seventh column fourth group 227D may comprise a circular shape and have a seventh column fourth group diameter between a range of 0.050 inch (0.127 cm) and 0.060 inch (0.152 cm). In various embodiments, each pedestal 215 in seventh column fourth group 227D may comprise a circular shape and have a seventh column fourth group diameter of 0.055 inch (0.140 cm). A seventh column fourth group pitch between each of the pedestals 215 in seventh column fourth group 227D may be between a range of 0.100 inch (0.254 cm) and 0.110 inch (0.279 cm). In various embodiments, the seventh column fourth group pitch between each of the pedestals 215 in seventh column fourth group 227D may be 0.103 inch (0.261 cm).

In various embodiments, eighth pedestal column 228 may comprise an eighth column first group 228A with 7 pedestals 215 extending radially in a direction substantially perpendicular from inner edge 211, an eighth column second group 228B with 5 pedestals 215 extending radially from eighth column first group 228A, an eighth column third group 228C with 11 pedestals extending radially from eighth column second group 228B, and/or an eighth column fourth group 228D with 6 pedestals 215 extending radially from eighth column third group 228C in a direction substantially perpendicular to outer edge 212.

In various embodiments, each pedestal 215 in eighth column first group 228A may comprise a circular shape and have an eighth column first group diameter between a range of 0.05 inch (0.127 cm) and 0.07 inch (0.178 cm). In various embodiments, each pedestal 215 in eighth column first group 228A may comprise a circular shape and have an eighth column first group diameter of 0.06 inch (0.152 cm). An eighth column first group pitch between each of the pedestals 215 in eighth column first group 228A may be between a range of 0.100 inch (0.254 cm) and 0.110 inch (0.279 cm). In various embodiments, the eighth column first group pitch between each of the pedestals 215 in eighth column first group 228A may be 0.104 inch (0.264 cm). In various embodiments, each pedestal 215 in eighth column second group 228B may comprise a circular shape and have an eighth column second group diameter between a range of 0.04 inch (0.102 cm) and 0.06 inch (0.152 cm). In various embodiments, each pedestal 215 in eighth column second group 228B may comprise a circular shape and have an eighth column second group diameter of 0.05 inch (0.127 cm). An eighth column second group pitch between each of the pedestals 215 in eighth column second group 228B may be between a range of 0.100 inch (0.254 cm) and 0.110 inch (0.279 cm). In various embodiments, the eighth column second group pitch between each of the pedestals 215 in eighth column second group 228B may be 0.104 inch (0.264 cm). In various embodiments, each pedestal 215 in eighth column third group 228C may comprise a circular shape and have an eighth column third group diameter between a range of 0.03 inch (0.076 cm) and 0.05 inch (0.127 cm). In various embodiments, each pedestal 215 in eighth column third group 228C may comprise a circular shape and have an eighth column third group diameter of 0.04 inch (0.102 cm). An eighth column third group pitch between each of the pedestals 215 in eighth column third group 228C may be between a range of 0.100 inch (0.254 cm) and 0.110 inch (0.279 cm). In various embodiments, the eighth column third group pitch between each of the pedestals 215 in eighth column third group 228C may be 0.104 inch (0.264 cm). In various embodiments, each pedestal 215 in eighth column fourth group 228D may comprise a circular shape and have an eighth column fourth group diameter between a range of 0.04 inch (0.102 cm) and 0.06 inch (0.152 cm). In various embodiments, each pedestal 215 in eighth column fourth group 228D may comprise a circular shape and have an eighth column fourth group diameter of 0.05 inch (0.127 cm). An eighth column fourth group pitch between each of the pedestals 215 in eighth column fourth group 228D may be between a range of 0.100 inch (0.254 cm) and 0.110 inch (0.279 cm). In various embodiments, the eighth column fourth group pitch between each of the pedestals 215 in eighth column fourth group 228D may be 0.104 inch (0.264 cm).

In various embodiments, with reference to FIGS. 5A-5C, vane core 500 may comprise a scallop mold 513 disposed on inner diameter surface 511 and/or outer diameter surface 512. In various embodiments, inner diameter surface 511 and/or outer diameter surface 512 may comprise two scallop molds 513 each, or any suitable number of scallop molds 513. In various embodiments, core body 510 (also depicted in FIG. 5C) may comprise eight pedestal mold columns 520 with pedestal molds 515 spanning radially in each pedestal mold column 520 between leading edge 508 and trailing edge 509: a first pedestal mold column 521, a second pedestal mold column 522 axially adjacent to first pedestal mold column 521, a third pedestal mold column 523 axially adjacent to second pedestal mold column 522, a fourth pedestal mold column 524 axially adjacent to third pedestal mold column 523, a fifth pedestal mold column 525 axially adjacent to fourth pedestal mold column 524, a sixth pedestal mold column 526 axially adjacent to fifth pedestal mold column 525, a seventh pedestal mold column 527 axially adjacent to sixth pedestal mold column 526, and an eighth pedestal mold column 528 axially adjacent to seventh pedestal mold column 527.

In various embodiments, first pedestal mold column 521 may comprise 18 first column pedestal molds. Each pedestal mold 515 of the first column pedestal molds may comprise a circular shape and have a first column pedestal mold diameter between a range of 0.070 inch (0.178 cm) to 0.080 (0.203 cm). In various embodiments, each pedestal mold 515 of the first column pedestal molds may comprise a circular shape and have a first column pedestal mold diameter 0.075 inch (0.19 cm). In various embodiments, a first column pitch between each of the first column pedestal molds may be between a range of 0.140 inch (0.356 cm) to 0.190 inch (0.483 cm). In various embodiments, the first column pitch between each of the first column pedestal molds may be between a range of 0.149 inch (0.378 cm) and 0.180 inch (0.457 cm).

In various embodiments, second pedestal mold column 522 may comprise 19 second column pedestal molds. Each pedestal mold 515 of the second column pedestal molds may comprise a circular shape and have a second column pedestal mold diameter between a range of 0.070 inch (0.178 cm) and 0.080 inch (0.203 cm). In various embodiments, each pedestal mold 515 of the second column pedestal molds may comprise a circular shape and have a second column pedestal mold diameter of 0.072 inch (0.18 cm). A second column pitch between each of the second column pedestal molds may be between a range of 0.140 inch (0.356 cm) to 0.190 inch (0.483 cm). In various embodiments, the second column pitch between each of the second column pedestal molds may be between a range of 0.149 inch (0.378 cm) and 0.180 inch (0.457 cm).

In various embodiments, third pedestal mold column 523 may comprise 18 third column pedestal molds. Each pedestal mold 515 of the third column pedestal molds may comprise a circular shape and have a third column pedestal mold diameter between a range of 0.05 inch (0.127 cm) and 0.07 inch (0.179 cm). In various embodiments, each pedestal mold 515 of the third column pedestal molds may comprise a circular shape and have a third column pedestal mold diameter of 0.06 inch (0.152 cm). A third column pitch between each of the third column pedestal molds may be between a range of 0.140 inch (0.356 cm) and 0.190 inch (0.483 cm). In various embodiments, the third column pitch between each of the third column pedestal molds may be between a range of 0.149 inch (0.378 cm) and 0.180 inch (0.457 cm).

In various embodiments, fourth pedestal mold column 524 may comprise 19 fourth pedestal molds. Each pedestal mold 515 of the fourth column pedestal molds may comprise a circular shape and have a fourth column pedestal mold diameter between a range of 0.070 inch (0.178 cm) and 0.080 inch (0.203 cm). In various embodiments, each pedestal mold 515 of the fourth column pedestal molds may comprise a circular shape and have a fourth column pedestal mold diameter of 0.073 inch (0.185 cm). A fourth column pitch between each of the third column pedestal molds may be between a range of 0.148 inch (0.376 cm) and 0.188 inch (0.478 cm).

In various embodiments, fifth pedestal mold column 525 may comprise a fifth column first group 525A with 4 pedestal molds 515 extending radially in a direction substantially perpendicular from inner diameter surface 511, a fifth column second group 525B with 3 pedestal molds 515 extending radially from fifth column first group 525A, a fifth column third group 525C with 4 pedestal molds extending radially from fifth column second group 525B, a fifth column fourth group 525D with 3 pedestal molds 515 extending radially from fifth column third group 525C, and/or a fifth column fifth group 525E with 4 pedestal molds 515 extending radially from fifth column fourth group 525D and in a direction substantially perpendicular to outer diameter surface 512.

In various embodiments, each pedestal mold 515 in fifth column first group 525A may comprise a circular shape and have a fifth column first group diameter between a range of 0.070 inch (0.178 cm) and 0.080 inch (0.203 cm). In various embodiments, each pedestal mold 515 in fifth column first group 525A may comprise a circular shape and have a fifth column first group diameter of 0.076 inch (0.193 cm). A fifth column first group pitch between each of the pedestal molds 515 in fifth column first group 525A may be between a range of 0.140 inch (0.356 cm) and 0.150 inch (0.381 cm). In various embodiments, the fifth column first group pitch between each of the pedestal molds 515 in fifth column first group 525A may be 0.148 inch (0.376 cm). In various embodiments, each pedestal mold 515 in fifth column second group 525B may comprise a circular shape and have a fifth column second group diameter between a range of 0.070 inch (0.178 cm) and 0.080 inch (0.203 cm). In various embodiments, each pedestal mold 515 in fifth column second group 525B may comprise a circular shape and have a fifth column second group diameter of 0.073 inch (0.185 cm). A fifth column second group pitch between each of the pedestal molds 515 in fifth column second group 525B may be between a range of 0.140 inch (0.356 cm) and 0.160 (0.406 cm). In various embodiments, the fifth column second group pitch between each of the pedestal molds 515 in fifth column second group 525B may be between a range of 0.148 inch (0.376 cm) and 0.155 inch (0.394 cm). In various embodiments, each pedestal mold 515 in fifth column third group 525C may comprise a circular shape and have a fifth column third group diameter between a range of 0.060 inch (0.152 cm) and 0.070 inch (0.178 cm). In various embodiments, each pedestal mold 515 in fifth column third group 525C may comprise a circular shape and have a fifth column third group diameter of 0.063 inch (0.160 cm). A fifth column third group pitch between each of the pedestal molds 515 in fifth column third group 525C may be between a range of 0.160 inch (0.406 cm) and 0.19 inch (0.483 cm). In various embodiments, the fifth column third group pitch between each of the pedestal molds 515 in fifth column third group 525C may be between a range of 0.155 inch (0.394 cm) and 0.18 inch (0.457 cm). In various embodiments, each pedestal mold 515 in fifth column fourth group 525D may comprise a circular shape and have a fifth column fourth group diameter between a range of 0.070 inch (0.178 cm) and 0.080 inch (0.203 cm). In various embodiments, each pedestal mold 515 in fifth column fourth group 525D may comprise a circular shape and have a fifth column fourth group diameter of 0.073 inch (0.185 cm). A fifth column fourth group pitch between each of the pedestal molds 515 in fifth column fourth group 525D may be between a range of 0.160 inch (0.406 cm) and 0.170 inch (0.432 cm). In various embodiments, the A fifth column fourth group pitch between each of the pedestal molds 515 in fifth column fourth group 525D may be 0.165 inch (0.419 cm). In various embodiments, each pedestal mold 515 in fifth column fifth group 525E may comprise a circular shape and have a fifth column fifth group diameter between a range of 0.070 inch (0.178 cm) and 0.080 inch (0.203 cm). In various embodiments, each pedestal mold 515 in fifth column fifth group 525E may comprise a circular shape and have a fifth column fifth group diameter of 0.076 inch (0.193 cm). A fifth column fifth group pitch between each of the pedestal molds 515 in fifth column fifth group 525E may be between a range of 0.140 inch (0.356 cm) and 0.150 inch (0.381 cm). In various embodiments, the fifth column fifth group pitch between each of the pedestal molds 515 in fifth column fifth group 525E may be 0.148 inch (0.376 cm).

In various embodiments, sixth pedestal mold column 526 may comprise a sixth column first group 526A with 7 pedestal molds 515 extending radially in a direction substantially perpendicular from inner diameter surface 511, a sixth column second group 526B with 5 pedestal molds 515 extending radially from sixth column first group 526A, a sixth column third group 526C with 10 pedestal molds extending radially from sixth column second group 526B, and/or a sixth column fourth group 526D with 7 pedestal molds 515 extending radially from sixth column third group 526C in a direction substantially perpendicular to outer diameter surface 512.

In various embodiments, each pedestal mold 515 in sixth column first group 526A may comprise an oval shape and have a sixth column first group length between a range of 0.060 and 0.070 and a sixth column first group width between a range of 0.050 inch (0.127 cm) and 0.060 inch (0.152 cm). In various embodiments, each pedestal mold 515 in sixth column first group 526A may comprise an oval shape and have a sixth column first group length of 0.063 inch (0.160 cm) and a sixth column first group width of 0.055 inch (0.140 cm). A sixth column first group pitch between each of the pedestal molds 515 in sixth column first group 526A may be between a range of 0.100 inch (0.254 cm) and 0.110 inch (0.279 cm). In various embodiments, the sixth column first group pitch between each of the pedestal molds 515 in sixth column first group 526A may be 0.102 inch (0.259 cm). In various embodiments, each pedestal mold 515 in sixth column second group 526B may comprise a circular shape and have a sixth column second group diameter between a range of 0.050 inch (0.127 cm) and 0.060 inch (0.152 cm). In various embodiments, each pedestal mold 515 in sixth column second group 526B may comprise a circular shape and have a sixth column second group diameter of 0.055 inch (0.140 cm). A sixth column second group pitch between each of the pedestal molds 515 in sixth column second group 526B may be between a range of 0.100 inch (0.254 cm) and 0.110 inch (0.279 cm). In various embodiments, the sixth column second group pitch between each of the pedestal molds 515 in sixth column second group 526B may be 0.103 inch (0.261 cm). In various embodiments, each pedestal mold 515 in sixth column third group 526C may comprise a circular shape and have a sixth column third group diameter between a range of 0.040 inch (0.102 cm) and 0.050 inch (0.127 cm). In various embodiments, each pedestal mold 515 in sixth column third group 526C may comprise a circular shape and have a sixth column third group diameter of 0.045 inch (0.114 cm). A sixth column third group pitch between each of the pedestal molds 515 in sixth column third group 526C may be between a range of 0.100 inch (0.254 cm) and 0.110 inch (0.279 cm). In various embodiments, the sixth column third group pitch between each of the pedestal molds 515 in sixth column third group 526C may be 0.103 inch (0.114 cm). In various embodiments, each pedestal mold 515 in sixth column fourth group 526D may comprise a circular shape and have a sixth column fourth group diameter between a range of 0.050 inch (0.127 cm) and 0.060 inch (0.152 cm). In various embodiments, each pedestal mold 515 in sixth column fourth group 526D may comprise a circular shape and have a sixth column fourth group diameter of 0.055 inch (0.140 cm). A sixth column fourth group pitch between each of the pedestal molds 515 in sixth column fourth group 526D may be between a range of 0.100 inch (0.254 cm) and 0.110 inch (0.279 cm). In various embodiments, the sixth column fourth group pitch between each of the pedestal molds 515 in sixth column fourth group 526D may be 0.102 inch (0.259 cm).

In various embodiments, seventh pedestal mold column 527 may comprise a seventh column first group 527A with 6 pedestal molds 515 extending radially in a direction substantially perpendicular from inner diameter surface 511, a seventh column second group 527B with 5 pedestal molds 515 extending radially from seventh column first group 527A, a seventh column third group 527C with 10 pedestal molds extending radially from seventh column second group 527B, and/or a seventh column fourth group 527D with 7 pedestal molds 515 extending radially from seventh column third group 527C in a direction substantially perpendicular to outer diameter surface 512.

In various embodiments, each pedestal mold 515 in seventh column first group 527A may comprise an oval shape and have a seventh column first group length between a range of 0.060 and 0.070 and a seventh column first group width between a range of 0.050 inch (0.127 cm) and 0.060 inch (0.152 cm). In various embodiments, each pedestal mold 515 in seventh column first group 527A may comprise an oval shape and have a seventh column first group length of 0.063 inch (0.160 cm) and a seventh column first group width of 0.055 inch (0.140 cm). A seventh column first group pitch between each of the pedestal molds 515 in seventh column first group 527A may be between a range of 0.100 inch (0.254 cm) and 0.110 inch (0.279 cm). In various embodiments, the seventh column first group pitch between each of the pedestal molds 515 in seventh column first group 527A may be 0.103 inch (0.261 cm). In various embodiments, each pedestal mold 515 in seventh column second group 527B may comprise a circular shape and have a seventh column second group diameter between a range of 0.050 inch (0.127 cm) and 0.060 inch (0.152 cm). In various embodiments, each pedestal mold 515 in seventh column second group 527B may comprise a circular shape and have a seventh column second group diameter of 0.055 inch (0.140 cm). A seventh column second group pitch between each of the pedestal molds 515 in seventh column second group 527B may be between a range of 0.100 inch (0.254 cm) and 0.110 inch (0.279 cm). In various embodiments, the seventh column second group pitch between each of the pedestal molds 515 in seventh column second group 527B may be 0.103 inch (0.261 cm). In various embodiments, each pedestal mold 515 in seventh column third group 527C may comprise a circular shape and have a seventh column third group diameter between a range of 0.040 inch (0.102 cm) and 0.050 inch (0.127 cm). In various embodiments, each pedestal mold 515 in seventh column third group 527C may comprise a circular shape and have a seventh column third group diameter of 0.045 inch (0.114 cm). A seventh column third group pitch between each of the pedestal molds 515 in seventh column third group 527C may be between a range of 0.100 inch (0.254 cm) and 0.110 inch (0.279 cm). In various embodiments, the seventh column third group pitch between each of the pedestal molds 515 in seventh column third group 527C may be 0.103 inch (0.114 cm). In various embodiments, each pedestal mold 515 in seventh column fourth group 527D may comprise a circular shape and have a seventh column fourth group diameter between a range of 0.050 inch (0.127 cm) and 0.060 inch (0.152 cm). In various embodiments, each pedestal mold 515 in seventh column fourth group 527D may comprise a circular shape and have a seventh column fourth group diameter of 0.055 inch (0.140 cm). A seventh column fourth group pitch between each of the pedestal molds 515 in seventh column fourth group 527D may be between a range of 0.100 inch (0.254 cm) and 0.110 inch (0.279 cm). In various embodiments, the seventh column fourth group pitch between each of the pedestal molds 515 in seventh column fourth group 527D may be 0.103 inch (0.261 cm).

In various embodiments, eighth pedestal mold column 528 may comprise an eighth column first group 528A with 7 pedestal molds 515 extending radially in a direction substantially perpendicular from inner diameter surface 511, an eighth column second group 528B with 5 pedestal molds 515 extending radially from eighth column first group 528A, an eighth column third group 528C with 11 pedestal molds extending radially from eighth column second group 528B, and/or an eighth column fourth group 528D with 6 pedestal molds 515 extending radially from eighth column third group 528C in a direction substantially perpendicular to outer diameter surface 512.

In various embodiments, each pedestal mold 515 in eighth column first group 528A may comprise a circular shape and have an eighth column first group diameter between a range of 0.05 inch (0.127 cm) and 0.07 inch (0.178 cm). In various embodiments, each pedestal mold 515 in eighth column first group 528A may comprise a circular shape and have an eighth column first group diameter of 0.06 inch (0.152 cm). An eighth column first group pitch between each of the pedestal molds 515 in eighth column first group 528A may be between a range of 0.100 inch (0.254 cm) and 0.110 inch (0.279 cm). In various embodiments, the eighth column first group pitch between each of the pedestal molds 515 in eighth column first group 528A may be 0.104 inch (0.264 cm). In various embodiments, each pedestal mold 515 in eighth column second group 528B may comprise a circular shape and have an eighth column second group diameter between a range of 0.04 inch (0.102 cm) and 0.06 inch (0.152 cm). In various embodiments, each pedestal mold 515 in eighth column second group 528B may comprise a circular shape and have an eighth column second group diameter of 0.05 inch (0.127 cm). An eighth column second group pitch between each of the pedestal molds 515 in eighth column second group 528B may be between a range of 0.100 inch (0.254 cm) and 0.110 inch (0.279 cm). In various embodiments, the eighth column second group pitch between each of the pedestal molds 515 in eighth column second group 528B may be 0.104 inch (0.264 cm). In various embodiments, each pedestal mold 515 in eighth column third group 528C may comprise a circular shape and have an eighth column third group diameter between a range of 0.03 inch (0.076 cm) and 0.05 inch (0.127 cm). In various embodiments, each pedestal mold 515 in eighth column third group 528C may comprise a circular shape and have an eighth column third group diameter of 0.04 inch (0.102 cm). An eighth column third group pitch between each of the pedestal molds 515 in eighth column third group 528C may be between a range of 0.100 inch (0.254 cm) and 0.110 inch (0.279 cm). In various embodiments, the eighth column third group pitch between each of the pedestal molds 515 in eighth column third group 528C may be 0.104 inch (0.264 cm). In various embodiments, each pedestal mold 515 in eighth column fourth group 528D may comprise a circular shape and have an eighth column fourth group diameter between a range of 0.04 inch (0.102 cm) and 0.06 inch (0.152 cm). In various embodiments, each pedestal mold 515 in eighth column fourth group 528D may comprise a circular shape and have an eighth column fourth group diameter of 0.05 inch (0.127 cm). An eighth column fourth group pitch between each of the pedestal molds 515 in eighth column fourth group 528D may be between a range of 0.100 inch (0.254 cm) and 0.110 inch (0.279 cm). In various embodiments, the eighth column fourth group pitch between each of the pedestal molds 515 in eighth column fourth group 528D may be 0.104 inch (0.264 cm).

For illustrative purposes, this disclosure is described in terms of vane 200 (and vane core 500) which is part of the high pressure turbine 190 (depicted in FIG. 1). It should be noted, however, that it would not be outside the scope of this disclosure for vane 200 and/or vane core 500 to be related to a vane in a low pressure turbine, low pressure compressor, high pressure compressor, or any other airfoil in a gas turbine engine.

With reference to FIGS. 5A and 5C, cross sectional views of vane core 500 (which also correspond to cross-sectional views of internal cavity 210 depicted in FIGS. 2-4 and 6) is depicted along line 582, line 584, and line 586, showing, among other things, vane core body 510 and pedestal molds 515. Line 582 provides a cross section of vane core 500 that is 20% radially upward along vane core body 510 from the inner diameter surface 511 ("upward" meaning the radial direction from inner diameter surface 511 toward outer diameter surface 512), line 584 provides a cross section of vane core 500 is 50% radially upward along vane core body 510 from the inner diameter surface 511, and line 586 provides a cross section of vane core 500 is 80% radially upward along vane core body 510 from the inner diameter surface 511. Relating to the discussion of FIG. 3 regarding optimizing the thickness 290 at a length 270 from trailing edge 209 of internal cavity 210, FIG. 5C depicts the optimization of the thicknesses 590 at various lengths 570 from trailing edge 509 vane core body 510.

As depicted in FIG. 5A, lengths 571, 572, 573, 574, 575, and 576 along core body 510 are measured from trailing edge 509 starting from point 509A. Length 571 is 0.248 (0.630 cm) inch from point 509A, length 572 is 0.391 inch (0.993 cm) from point 509A, length 573 is 0.530 inch (1.346 cm) from point 509A, length 574 is 0.757 inch (1.923 cm) from point 509A, length 575 is 0.935 inch (2.375 cm) from point 509A, and length 576 is 1.117 inches (2.837 cm) from point 509A. At length 571, core body 510 may have a thickness 591 of 0.018 inch (0.046 cm). At length 572, core body 510 may have a thickness 592 of 0.022 inch (0.056 cm). At length 573, core body 510 may have a thickness 593 of 0.027 inch (0.069 cm). At length 574, core body 510 may have a thickness 594 of 0.035 inch (0.089 cm). At length 575, core body 510 may have a thickness 595 of 0.050 inch (0.127 cm). At length 576, core body 510 may have a thickness 596 of 0.068 inch (0.172 cm). In various embodiments, the thicknesses 590 of core body 510 depicted for the cross section along line 586 correspond to the thicknesses 590 of core body 510 at the same lengths 570 for the cross sections along lines 584 and 582, because the thickness of core body 510 is substantially uniform along radial axis 501.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil core, comprising:
    an outer diameter surface comprising a first outer scallop mold and a second outer scallop mold;
    an inner diameter surface opposite the outer diameter surface, the inner diameter surface comprising a first inner scallop mold and a second inner scallop mold;
    a leading edge between the outer diameter surface and the inner diameter surface;
    a trailing edge between the outer diameter surface and the inner diameter surface and opposite the leading edge; and
    a core body enclosed by the outer diameter surface, the inner diameter surface, the leading edge, and the trailing edge, the core body comprising:
        a first pedestal mold column;
        a second pedestal mold column axially adjacent to the first pedestal mold column;
        a third pedestal mold column axially adjacent to the second pedestal mold column;
        a fourth pedestal mold column axially adjacent to the third pedestal mold column;
        a fifth pedestal mold column axially adjacent to the fourth pedestal mold column;
        a sixth pedestal mold column axially adjacent to the fifth pedestal mold column;
        a seventh pedestal mold column axially adjacent to the sixth pedestal mold column; and
        an eighth pedestal mold column axially adjacent to the seventh pedestal mold column and the trailing edge,
        wherein the first pedestal mold column comprises 18 first column pedestal molds, wherein the 18 first column pedestal molds each comprise a first column pedestal mold diameter between a range of 0.070 inch to 0.080 inch.

2. The airfoil core of claim 1, wherein the second pedestal mold column comprises 19 second column pedestal molds, wherein the 19 second column pedestal molds each comprise a second column pedestal mold diameter between a range of 0.070 inch to 0.080 inch.

3. The airfoil core of claim 1, wherein the third pedestal mold column comprises 18 third column pedestal molds, wherein the 18 third column pedestal molds each comprise a third column pedestal mold diameter between a range of 0.05 inch and 0.07 inch.

4. The airfoil core of claim 1, wherein the fourth pedestal mold column comprises 19 fourth column pedestal molds, wherein the 19 fourth column pedestal molds each comprise a fourth column pedestal mold diameter between a range of 0.070 inch and 0.080 inch.

5. The airfoil core of claim 1, wherein the fifth pedestal mold column comprises:
    a fifth column first group extending radially from the inner diameter surface, the fifth column first group comprising 4 fifth column first group pedestal molds each having a fifth column first group diameter between a range of 0.070 inch and 0.080 inch;
    a fifth column second group extending radially from the fifth column first group, the fifth column second group comprising 3 fifth column second group pedestal molds each having a fifth column second group diameter between a range of 0.070 inch and 0.080 inch;
    a fifth column third group extending radially from the fifth column second group, the fifth column third group comprising 4 fifth column third group pedestal molds each having a fifth column third group diameter between a range of 0.060 inch and 0.070 inch;
    a fifth column fourth group extending radially from the fifth column third group, the fifth column fourth group comprising 3 fifth column fourth group pedestal molds each having a fifth column fourth group diameter between a range of 0.070 inch and 0.080 inch; and
    a fifth column fifth group extending radially from the fifth column fifth group and to the outer diameter surface, the fifth column fifth group comprising 4 fifth column fifth group pedestal molds each having a fifth column fifth group diameter between a range of 0.070 inch and 0.080 inch.

6. The airfoil core of claim 1, wherein the sixth pedestal mold column comprises:
    a sixth column first group extending radially from the inner diameter surface, the sixth column first group comprising 7 sixth column first group pedestal molds each having a sixth column first group length between a range of 0.060 inch and 0.070 inch and a sixth column first group width between a range of 0.050 inch and 0.060 inch;

a sixth column second group extending radially from the sixth column first group, the sixth column second group comprising 5 sixth column second group pedestal molds each having a sixth column second group diameter between a range of 0.050 inch and 0.060 inch;

a sixth column third group extending radially from the sixth column second group, the sixth column third group comprising 10 sixth column third group pedestal molds each having a sixth column third group diameter between a range of 0.040 inch and 0.050 inch; and a sixth column fourth group extending radially from the sixth column third group and to the outer diameter surface, the sixth column fourth group comprising 7 sixth column fourth group pedestal molds each having a sixth column fourth group diameter between a range of 0.050 inch and 0.060 inch.

7. The airfoil core of claim 1, wherein the seventh pedestal mold column comprises:

a seventh column first group extending radially from the inner diameter surface, the seventh column first group comprising 6 seventh column first group pedestal molds each having a seventh column first group length between a range of 0.060 inch and 0.070 inch and a seventh column first group width between a range of 0.050 inch and 0.060 inch;

a seventh column second group extending radially from the seventh column first group, the seventh column second group comprising 5 seventh column second group pedestal molds each having a seventh column second group diameter between a range of 0.050 inch and 0.060 inch;

a seventh column third group extending radially from the seventh column second group, the seventh column third group comprising 10 seventh column third group pedestal molds each having a seventh column third group diameter between a range of 0.040 inch and 0.050 inch; and a seventh column fourth group extending radially from the seventh column third group and to the outer diameter surface, the seventh column fourth group comprising 7 seventh column fourth group pedestal molds each having a seventh column fourth group diameter between a range of 0.050 inch and 0.060 inch.

8. The airfoil core of claim 1, wherein the eighth pedestal mold column comprises:

an eighth column first group extending radially from the inner diameter surface, the eighth column first group comprising 7 eighth column first group pedestal molds each having an eighth column first group diameter between a range of 0.05 inch and 0.07 inch;

an eighth column second group extending radially from the eighth column first group, the eighth column second group comprising 5 eighth column second group pedestal molds each having an eighth column second group diameter between a range of 0.04 inch and 0.06 inch;

an eighth column third group extending radially from the eighth column second group, the eighth column third group comprising 11 eighth column third group pedestal molds each having an eighth column third group diameter between a range of 0.03 inch and 0.05 inch; and an eighth column fourth group extending radially from the eighth column third group and to the outer diameter surface, the eighth column fourth group comprising 6 eighth column fourth group pedestal molds each having an eighth column fourth group diameter between a range of 0.04 inch and 0.06 inch.

9. An airfoil, comprising:

an airfoil body; and an internal cavity within the airfoil body, the internal cavity comprising:

an outer edge comprising a first outer scallop and a second outer scallop;

an inner edge opposite the outer edge, the inner edge comprising a first inner scallop and a second inner scallop;

a leading edge spanning between the outer edge and the inner edge; and a trailing edge spanning between the outer edge and the inner edge and opposite the leading edge;

wherein between the outer edge, the inner edge, the leading edge, and the trailing edge, the internal cavity comprises:

a first pedestal column;

a second pedestal column axially adjacent to the first pedestal column;

a third pedestal column axially adjacent to the second pedestal column;

a fourth pedestal column axially adjacent to the third pedestal column;

a fifth pedestal column axially adjacent to the fourth pedestal column;

a sixth pedestal column axially adjacent to the fifth pedestal column;

a seventh pedestal column axially adjacent to the sixth pedestal column; and an eighth pedestal column axially adjacent to the seventh pedestal column and the trailing edge, wherein the first pedestal column comprises 18 first column pedestals, wherein the 18 first column pedestals each comprise a first column pedestal diameter between a range of 0.070 inch to 0.080 inch.

10. The airfoil of claim 9, wherein:

the second pedestal column comprises 19 second column pedestals, wherein the 19 second column pedestals each comprise a second column pedestal diameter between a range of 0.070 inch to 0.080 inch;

the third pedestal column comprises 18 third column pedestals, wherein the 18 third column pedestals each comprise a third column pedestal diameter between a range of 0.05 inch and 0.07 inch; and the fourth pedestal column comprises 19 fourth column pedestals, wherein the 19 fourth column pedestals each comprise a fourth column pedestal diameter between a range of 0.070 inch to 0.080 inch.

11. The airfoil of claim 9, wherein the first pedestal column comprises a first column pitch between each of the 18 first column pedestals that is between a range of 0.140 inch and 0.190 inch.

12. The airfoil of claim 9, wherein the second pedestal column comprises a second column pitch between each of the 19 second column pedestals that is between a range of 0.140 inch and 0.190 inch, and the third pedestal column comprises a third column pitch between each of the 18 third column pedestals is between a range of 0.140 inch and 0.190 inch.

13. The airfoil of claim 9, wherein the fourth pedestal column comprises a fourth column pitch between each of the 18 fourth column pedestals that is between a range of 0.140 inch and 0.190 inch.

14. The airfoil of claim 9, wherein:
the fifth pedestal column comprises:
- a fifth column first group extending radially from the inner edge, the fifth column first group comprising 4 fifth column first group pedestals each having a fifth column first group diameter between a range of 0.070 inch to 0.080 inch;
- a fifth column second group extending radially from the fifth column first group, the fifth column second group comprising 3 fifth column second group pedestals each having a fifth column second group diameter between a range of 0.070 inch to 0.080 inch;
- a fifth column third group extending radially from the fifth column second group, the fifth column third group comprising 4 fifth column third group pedestals each having a fifth column third group diameter between a range of 0.060 inch and 0.070 inch;
- a fifth column fourth group extending radially from the fifth column third group, the fifth column fourth group comprising 3 fifth column fourth group pedestals each having a fifth column fourth group diameter between a range of 0.070 inch and 0.080 inch; and
- a fifth column fifth group extending radially from the fifth column fifth group and to the outer edge, the fifth column fifth group comprising 4 fifth column fifth group pedestals each having a fifth column fifth group diameter between a range of 0.070 inch and 0.080 inch;

the sixth pedestal column comprises:
- a sixth column first group extending radially from the inner edge, the sixth column first group comprising 7 sixth column first group pedestals each having a sixth column first group length between a range of 0.060 inch and 0.070 inch and a sixth column first group width between a range of 0.050 inch and 0.060 inch;
- a sixth column second group extending radially from the sixth column first group, the sixth column second group comprising 5 sixth column second group pedestals each having a sixth column second group diameter between a range of 0.050 inch and 0.060 inch;
- a sixth column third group extending radially from the sixth column second group, the sixth column third group comprising 10 sixth column third group pedestals each having a sixth column third group diameter between a range of 0.040 inch and 0.050 inch; and
- a sixth column fourth group extending radially from the sixth column third group and to the outer edge, the sixth column fourth group comprising 7 sixth column fourth group pedestals each having a sixth column fourth group diameter between a range of 0.050 inch and 0.060 inch;

the seventh pedestal column comprises:
- a seventh column first group extending radially from the inner edge, the seventh column first group comprising 6 seventh column first group pedestals each having a seventh column first group length between a range of 0.060 inch and 0.070 inch and a seventh column first group width between a range of 0.050 inch and 0.060 inch;
- a seventh column second group extending radially from the seventh column first group, the seventh column second group comprising 5 seventh column second group pedestals each having a seventh column second group diameter between a range of 0.050 inch and 0.060 inch;
- a seventh column third group extending radially from the seventh column second group, the seventh column third group comprising 10 seventh column third group pedestals each having a seventh column third group diameter between a range of 0.040 inch and 0.050 inch; and
- a seventh column fourth group extending radially from the seventh column third group and to the outer edge, the seventh column fourth group comprising 7 seventh column fourth group pedestals each having a seventh column fourth group diameter between a range of 0.050 inch and 0.060 inch; and the eighth pedestal column comprises:
- an eighth column first group extending radially from the inner edge, the eighth column first group comprising 7 eighth column first group pedestals each having an eighth column first group diameter between a range of 0.05 inch and 0.07 inch;
- an eighth column second group extending radially from the eighth column first group, the eighth column second group comprising 5 eighth column second group pedestals each having an eighth column second group diameter between a range of 0.04 inch and 0.06 inch;
- an eighth column third group extending radially from the eighth column second group, the eighth column third group comprising 11 eighth column third group pedestals each having an eighth column third group diameter between a range of 0.03 inch and 0.05 inch; and
- an eighth column fourth group extending radially from the eighth column third group and to the outer edge, the eighth column fourth group comprising 6 eighth column fourth group pedestals each having an eighth column fourth group diameter between a range of 0.04 inch and 0.06 inch.

15. The airfoil of claim 10, wherein:
the fifth column first group comprises a fifth column first group pitch between each of the 4 fifth column first group pedestals that is between a range of 0.140 inch and 0.150 inch;
the fifth column second group comprises a fifth column second group pitch between each of the 3 fifth column second group pedestals that is between a range of 0.140 inch and 0.160 inch;
the fifth column third group comprises a fifth column third group pitch between each of the 4 fifth column third group pedestals that is between a range of 0.150 inch and 0.190 inch;
the fifth column fourth group comprises a fifth column fourth group pitch between each of the 3 fifth column fourth group pedestals that is between a range of 0.160 inch and 0.170 inch; and
the fifth column fifth group comprises a fifth column fifth group pitch between each of the 4 fifth column fifth group pedestals that is between a range of 0.140 inch and 0.150 inch.

16. The airfoil of claim 14, wherein:
the sixth column first group comprises a sixth column first group pitch between each of the 7 sixth column first group pedestals that is between a range of 0.100 inch and 0.110 inch;

the sixth column second group comprises a sixth column second group pitch between each of the 5 sixth column second group pedestals that is between a range of 0.100 inch and 0.110 inch;

the sixth column third group comprises a sixth column third group pitch between each of the 10 sixth column third group pedestals that is between a range of 0.100 inch and 0.110 inch; and the sixth column fourth group comprises a sixth column fourth group pitch between each of the 7 sixth column fourth group pedestals that is between a range of 0.100 inch and 0.110 inch.

17. The airfoil of claim 14, wherein:

the seventh column first group comprises a seventh column first group pitch between each of the 6 seventh column first group pedestals that is between a range of 0.100 inch and 0.110 inch;

the seventh column second group comprises a seventh column second group pitch between each of the 5 seventh column second group pedestals that is between a range of 0.100 inch and 0.110 inch;

the seventh column third group comprises a seventh column third group pitch between each of the 10 seventh column third group pedestals that is between a range of 0.100 inch and 0.110 inch; and the seventh column fourth group comprises a seventh column fourth group pitch between each of the 7 seventh column fourth group pedestals that is between a range of 0.100 inch and 0.110 inch.

18. The airfoil of claim 14, wherein:

the eighth column first group comprises an eighth column first group pitch between each of the 7 eighth column first group pedestals that is between a range of 0.100 inch and 0.110 inch;

the eighth column second group comprises an eighth column second group pitch between each of the 5 eighth column second group pedestals that is between a range of 0.100 inch and 0.110 inch;

the eighth column third group comprises an eighth column third group pitch between each of the 11 eighth column third group pedestals that is between a range of 0.100 inch and 0.110 inch; and the eighth column fourth group comprises an eighth column fourth group pitch between each of the 6 eighth column fourth group pedestals that is between a range of 0.100 inch and 0.110 inch.

19. A gas turbine engine, comprising:

a high pressure turbine comprising an airfoil, the airfoil comprising:

an internal cavity within an airfoil body, the internal cavity comprising:

an outer edge comprising a first outer scallop and a second outer scallop;

an inner edge opposite the outer edge, the inner edge comprising a first inner scallop and a second inner scallop;

a leading edge spanning between the outer edge and the inner edge; and a trailing edge spanning between the outer edge and the inner edge and opposite the leading edge;

wherein between the outer edge, the inner edge, the leading edge, and the trailing edge, the internal cavity comprises:

a first pedestal column;

a second pedestal column axially adjacent to the first pedestal column;

a third pedestal column axially adjacent to the second pedestal column;

a fourth pedestal column axially adjacent to the third pedestal column;

a fifth pedestal column axially adjacent to the fourth pedestal column;

a sixth pedestal column axially adjacent to the fifth pedestal column;

a seventh pedestal column axially adjacent to the sixth pedestal column; and an eighth pedestal column disposed axially between the seventh pedestal column and the trailing edge, wherein the first pedestal column comprises 18 first column pedestals, wherein the 18 first column pedestals each comprise a first column pedestal diameter between a range of 0.070 inch to 0.080 inch.

* * * * *

UNITED STATES PATENT AND TRADEMARK OFFICE
CERTIFICATE OF CORRECTION

PATENT NO. : 10,132,168 B2
APPLICATION NO. : 15/069738
DATED : November 20, 2018
INVENTOR(S) : Jeffrey Leon et al.

Page 1 of 1

It is certified that error appears in the above-identified patent and that said Letters Patent is hereby corrected as shown below:

In the Claims

In Column 26, Line 42 please delete "claim 10" and therefore insert -- claim 14 --

Signed and Sealed this
Fifth Day of March, 2019

Andrei Iancu
*Director of the United States Patent and Trademark Office*